Jan. 28, 1941.  A. C. VELO  2,229,907
AUTOMATIC GEARSHIFT FOR VEHICLES
Filed April 21, 1934  6 Sheets-Sheet 1
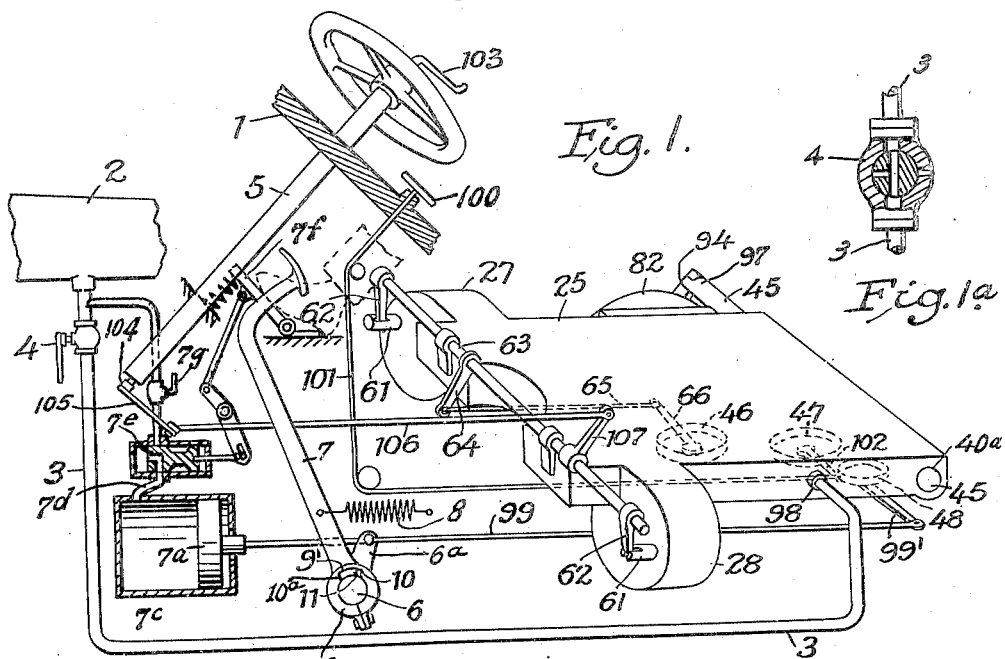
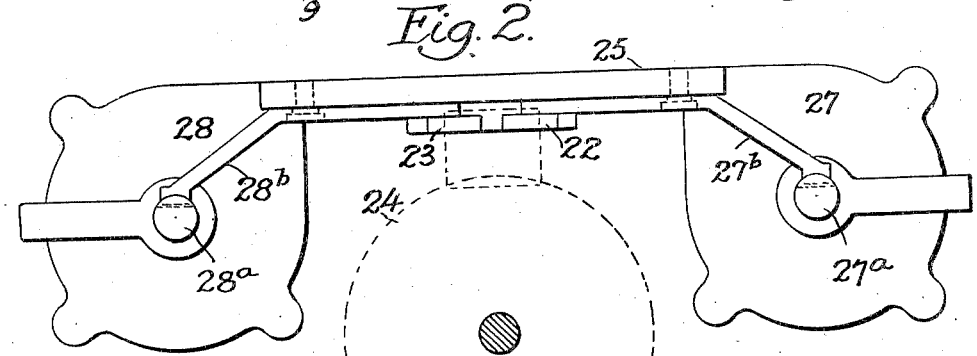
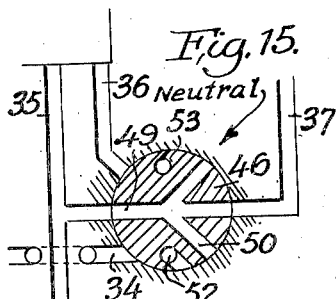
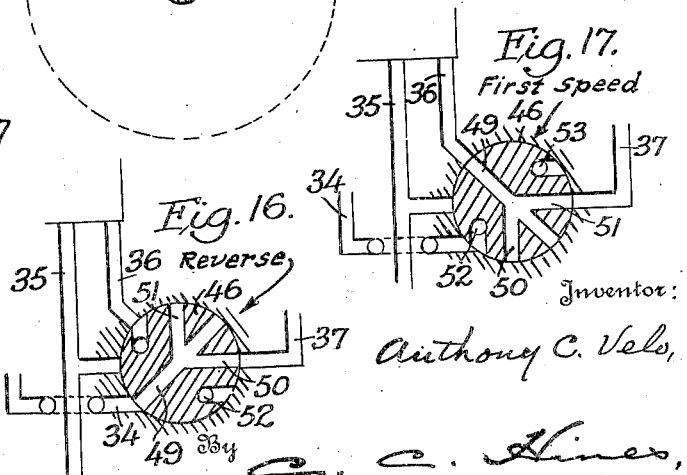
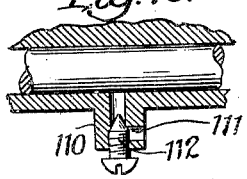
Inventor: Anthony C. Velo,
By C. C. Hines, Attorney.

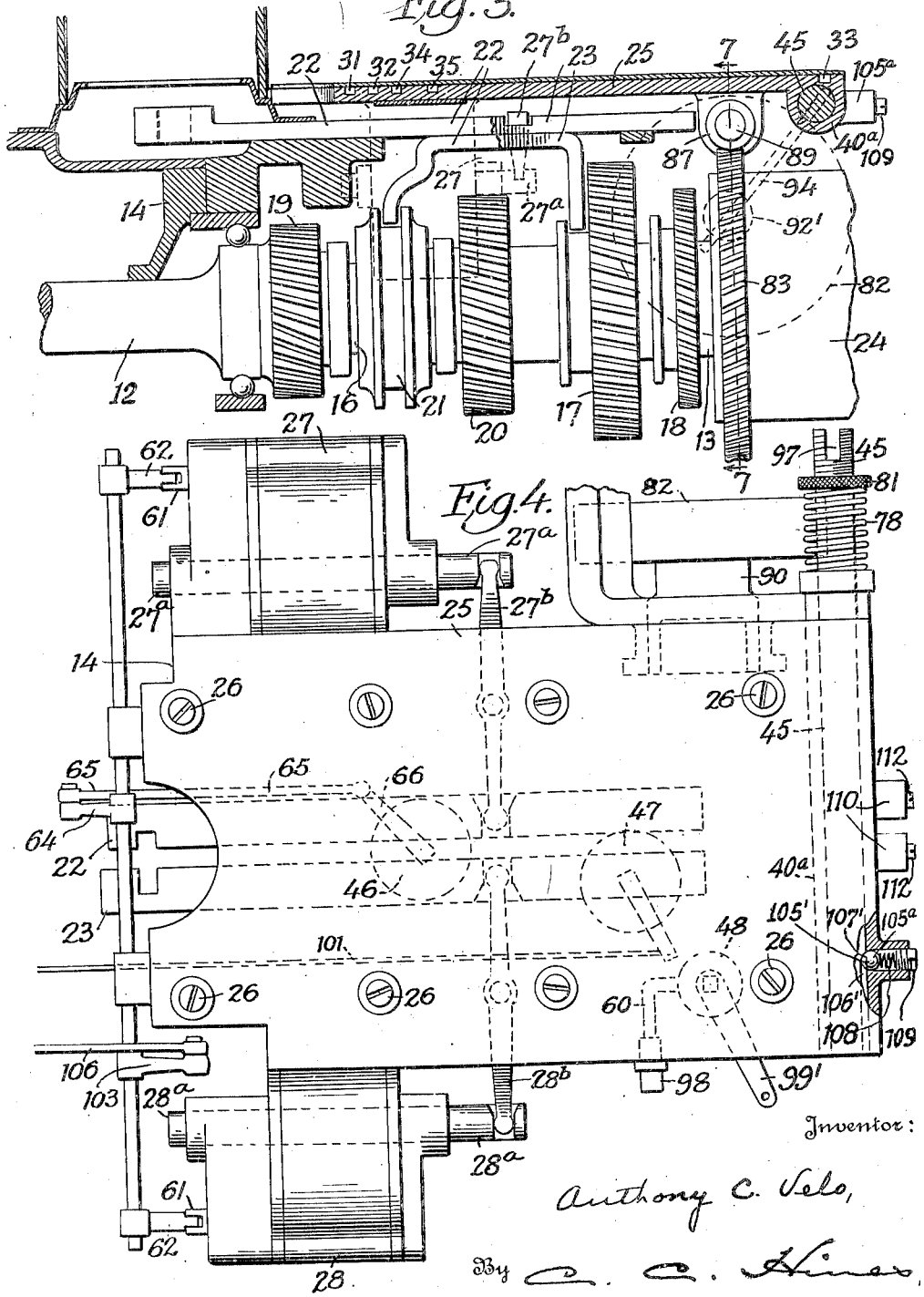

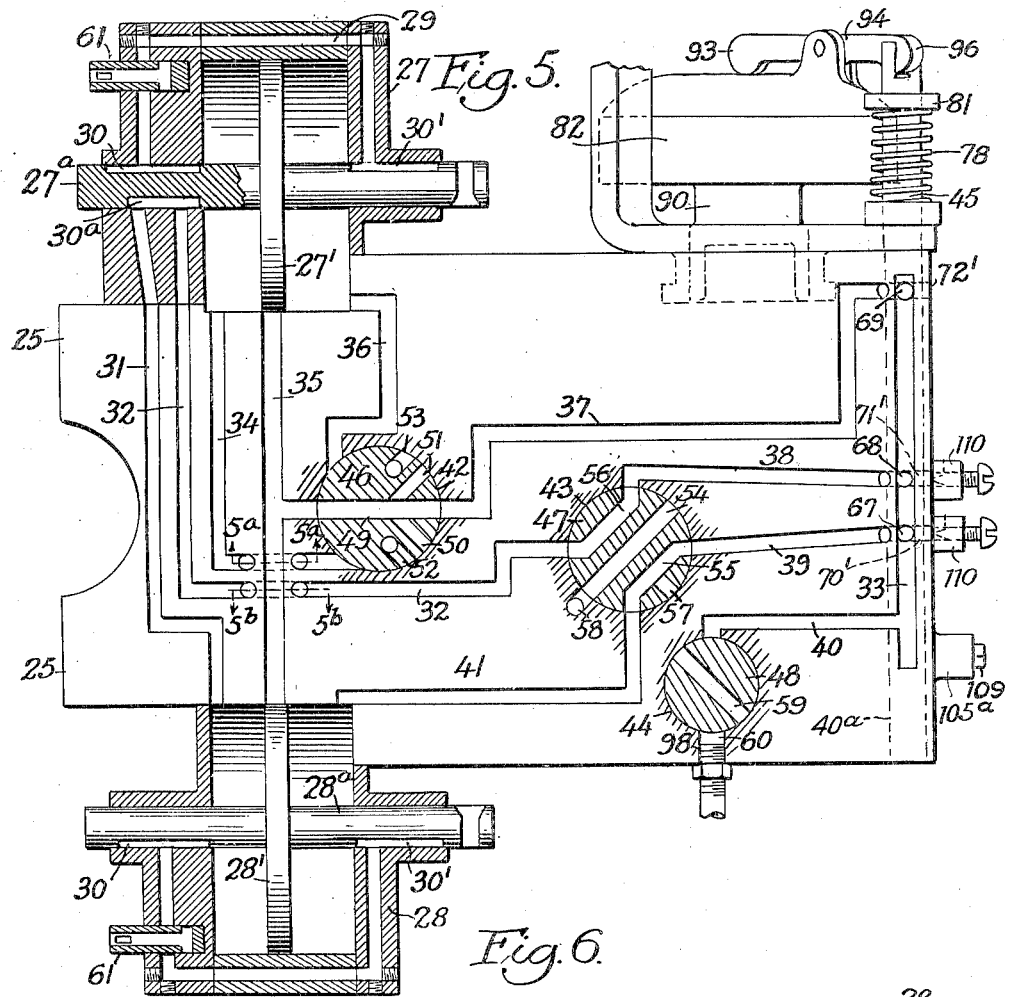
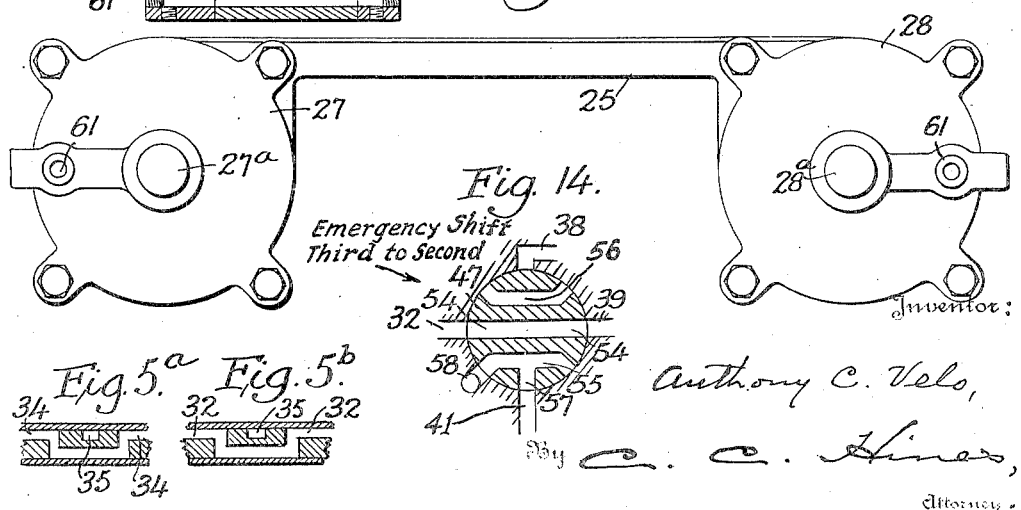

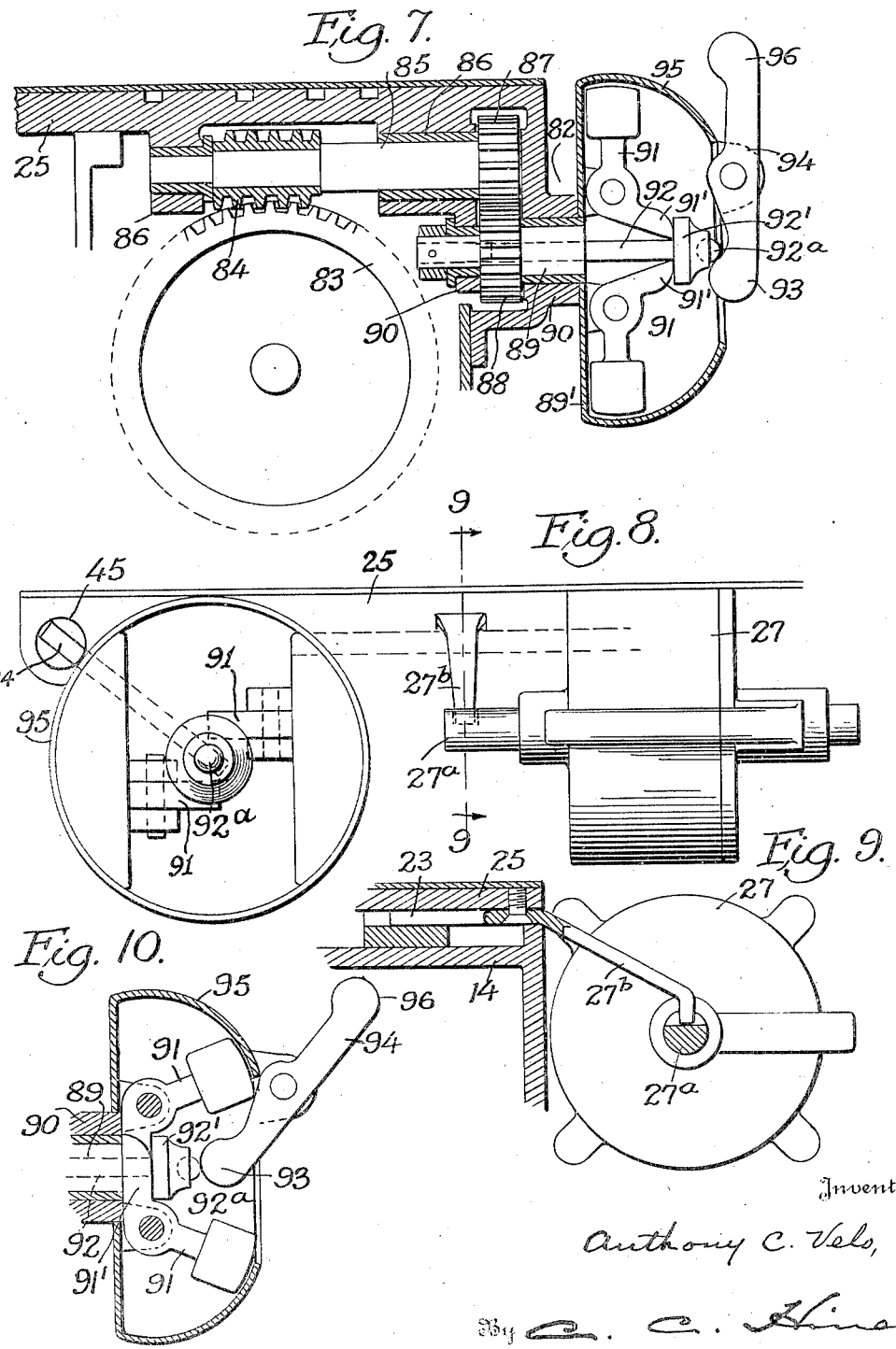

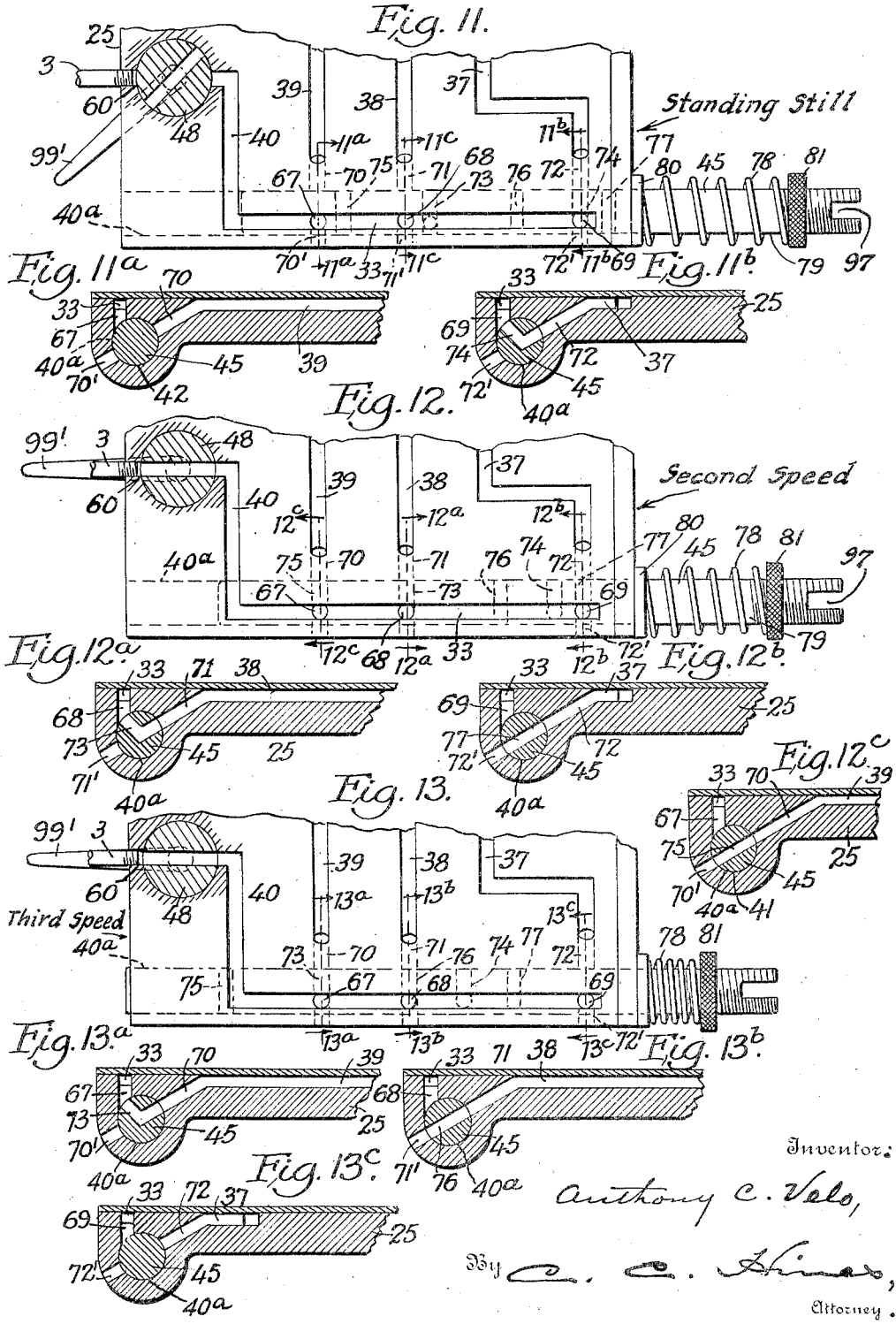

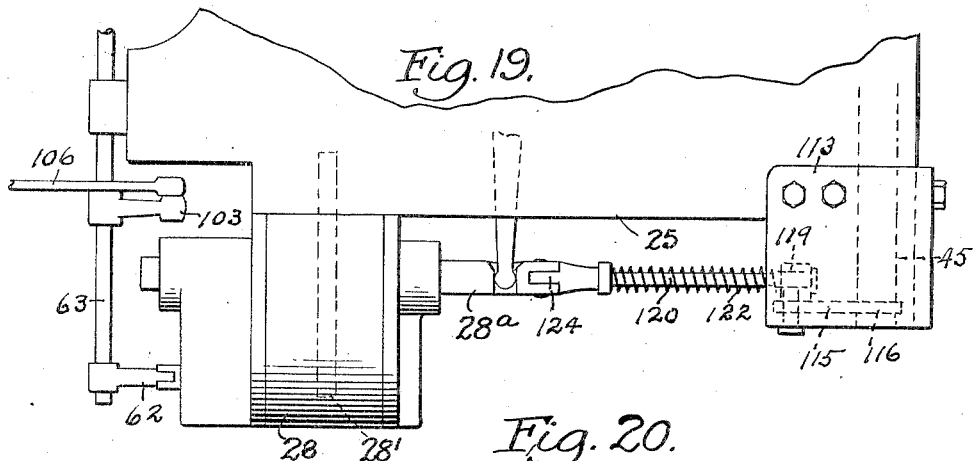
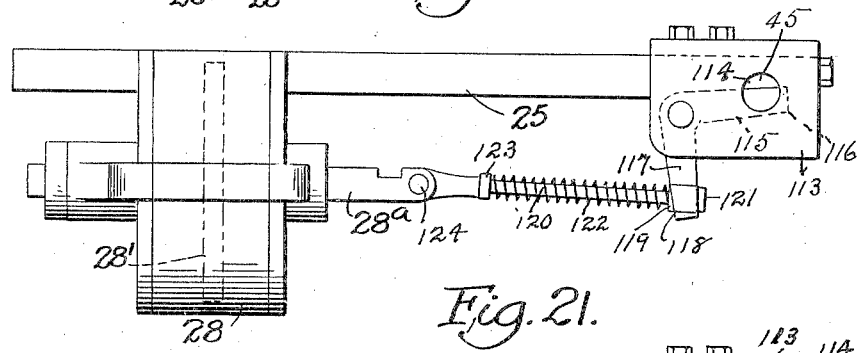
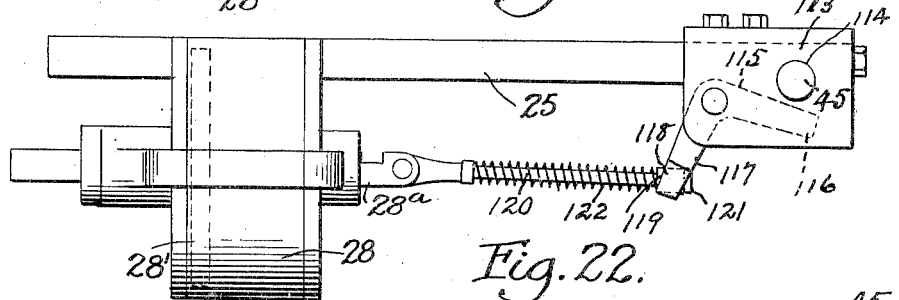
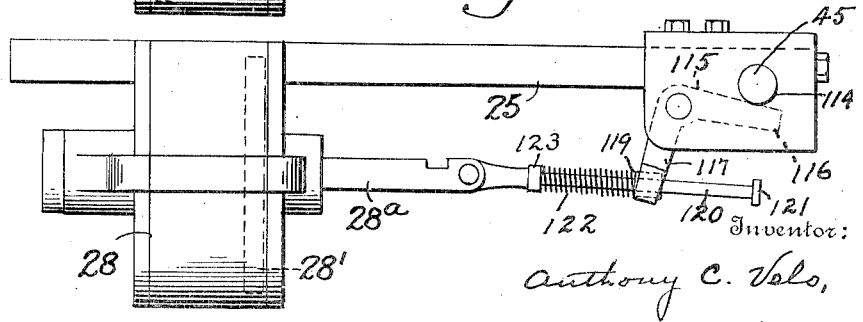

Patented Jan. 28, 1941

2,229,907

UNITED STATES PATENT OFFICE 2,229,907

AUTOMATIC GEARSHIFT FOR VEHICLES

Anthony C. Velo, Lancaster, Pa., assignor, by direct and mesne assignments, to Vaco Products, Inc., a corporation of Delaware Application April 21, 1934, Serial No. 721,777

90 Claims. (Cl. 192—.01)

This invention relates to automatic gearshifts or transmissions for vehicles, and particularly to a gearshift mechanism which, while adapted to be operated by any suitable power means having as its origin as a source of power the vehicle engine, is particularly designed and adapted to be actuated by pneumatic means operated by vacuum or compressed air power generated by the vehicle engine. More particularly the invention relates to a vacuum or compressed air operated gearshift which is adapted to be used either in connection with a manually operated clutch for semi-automatic change speed operations of the vehicle, or in connection with an automatic clutch, in which suitable clutch actuating means, operated or controlled by movements of an eccelerator, are provided, whereby change speed operations of the vehicle are rendered either entirely automatic or substantially so.

The automatic gearshift mechanism herein shown is an improvement in certain respects upon the gearshift mechanism disclosed in my prior application, Serial No. 614,573, filed May 31, 1932.

One object of the invention is to provide a gearshift mechanism which may be used in connection with any conventional type of manually operable or automatic clutch now in use.

Another object of the invention is to provide a gearshift mechanism which may be used in connection with, or independent of, any of the types of free-wheeling units now in use.

Still another object of the invention is to provide means operated or controlled by an automatic power clutch operating means, or a clutch pedal operated means, for controlling the power means for the power gearshift, whereby the gearshift may not be operated until the clutch is disengaged.

Still another object of the invention is to provide an automatic gearshift mechanism in which the gearshift operating means for actuating the shifters, and which may include the shifters themselves, is mounted on the cover or head of the gearshift casing or housing, thereby furnishing a gearshift operating means in the form of an operating unit which is complete in itself and may be applied and removed with the housing cover and for use with any conventional type of transmission gearing.

Still another object of the invention is to provide a gearshift operating unit which is controlled for automatic speed change actions by means of a centrifugal governor driven by a free-wheeling unit when such is used, or by the speedometer drive gear or other means constantly driven by the running gear of the vehicle, or by any other suitable type of driven element on the driven side of the transmission, so that the governor will at all times be responsive to vehicle speed instead of engine speed.

Still another object of the invention is to provide a gearshift operating means and governor driving means the parts of which will be wholly or substantially enclosed and protected from injury.

Still another object of the invention is to provide a gearshift operating means adapted in the running of the vehicle to automatically shift the gearing into neutral in making speed changes of the gearing responsive to vehicle speeds and the operation of the clutch, without the use of an auxiliary valve provided for that purpose, and without the necessity of the operation of manually operable selective means by the driver of the vehicle.

Still another object of the invention is to provide a gearshift operating means adapted to effect an automatic change from first to second speed in a simple and efficient manner and without the manual operation of selective controls or an auxiliary valve for the purpose.

Still another object of the invention is to provide a gearshift operating means which may be manually controlled for a rapid shift from high to intermediate speed for an emergency action, as when such a shift is required in hill climbing, etc., without the necessity of waiting for a drop in the speed of the car to secure the usual automatic shift.

Still another object of the invention is to provide an automatic gearshift mechanism which is simple and inexpensive in construction and reliable and efficient in action; which employs fluid lines adapted to serve both as feed or suction and vent lines, together with a cooperating speed controlled valve which reduces the number of passages and auxiliary valves required for service as compared with the pneumatic gearshifts heretofore suggested, and otherwise materially reduces the number of parts necessary to be employed; and which is so constructed and operated as to be proof against faulty actions in its automatic control of the gearshift mechanism.

A still further object of the invention is to provide retarding or checking means acting on the speed controlled valve to maintain it in second speed position and from change to high speed position under the operation of the centrifugal governor until the latter has reached a proper speed for such speed change.

A still further object of the invention is to provide throttling means for controlling the flow of supernormal or atmospheric air to the working parts of the gearshift operating mechanism through the atmospheric air inlet or vent ports employed so as to properly regulate the acting air pressures responsive to the available suction power of the vehicle motor, when such is used for securing the motive force for shifting the gears, whereby a proper application of working power to the working parts and a proper timing of their working actions may be secured.

With these and other objects in view, which will appear in the course of the subjoined description, the invention consists of the novel features of construction, combination and arrangement of parts, hereinafter fully described and claimed, reference being had to the accompanying drawings, in which—

Fig. 1 is a diagrammatic perspective view of the gearshift operating unit and coacting elements.

Fig. 1a is a detail section through a cut-out valve in the vacuum line.

Fig. 2 is a rear end view of the casing of the gearshift unit and parts carried thereby.

Fig. 3 is a vertical longitudinal section through the upper portion of the gearshift housing and showing coacting parts of the gearshift mechanism and its automatic operating means.

Fig. 4 is a top plan view of the housing cover or head and elements of the gearshift operating unit.

Fig. 5 is a top plan view of the gearshift housing cover member or head from which the face plate has been removed, showing the system of ports, passages and valves formed in and carried thereby, the gearshift cylinders appearing in section.

Figs. 5a and 5b are detail sections on lines 5a—5a and 5b—5b of Fig. 5.

Fig. 6 is a front end view of the unit with parts removed.

Fig. 7 is a vertical transverse section taken substantially on line 7—7 of Fig. 3.

Fig. 8 is a view in elevation looking toward that side of the unit on which the governor is located.

Fig. 9 is a section on line 9—9 of Fig. 8.

Fig. 10 is a detail section through the governor.

Figs. 11, 12 and 13 are fragmentary plan views of the cover plate showing, respectively, standing still, second speed and third speed positions of the speed controlled governor valve and corresponding positions of the clutch controlled valve.

Figs. 11a and 11b are detail sections on lines 11a—11a and 11b—11b of Fig. 11, which section on line 11a—11a corresponds in structure and except as regards to location and numbering of ports with a similar section taken on line 11c—11c of Fig. 11 in the same position of the speed controlled valve.

Figs. 12a, 12b and 12c are similar detail sections on lines 12a—12a, 12b—12b and 12c—12c of Fig. 12.

Figs. 13a, 13b and 13c are similar detail sections taken respectively on lines 13a—13a, 13b—13b and 13c—13c of Fig. 13.

Fig. 14 is a view showing the emergency valve in operating position for second and third speed shifts.

Figs. 15, 16 and 17 are views of the selector valve in neutral, reverse and first speed positions.

Fig. 18 is a detail section showing the air inlet controlling device.

Fig. 19 is a fragmentary plan view of the gear shift operating mechanism showing another and preferred construction of retarder or stop device for controlling the action of the speed controlled valve.

Figs. 20, 21 and 22 are side elevations of the same showing the retarder or stop device in different positions.

In the accompanying drawings I have shown my invention as constructed and designed to employ as a power medium the suction or vacuum produced by the automobile engine and using for this purpose suitable suction, pressure and relief passages or conduits connected with the intake manifold of the engine and the atmosphere, but it is to be understood that any other character of pneumatic or other suitable power means for supplying power produced directly or indirectly by the automobile engine may be employed. In the present instance I have also shown my invention as constructed and designed for use in conjunction with an automatically operated clutch for the purpose of making the gearshift mechanism entirely automatic in character, except as to initial starting or reverse actions or special service purposes, all operations being otherwise automatically performed as long as the vehicle is in course of travel; although it is to be understood that the invention may be used in connection with a manually operated clutch or a clutch which is normally automatically operated but may be manually operated whenever the automatic clutch operating means becomes inoperative from any cause. The invention may, furthermore, be designed and adapted for use in connection with a free-wheeling unit or not, according to the election of the automobile manufacturer or user, and may be suitably constructed for the use of a manually operable gearshift lever for shifting the gearshifters, as in the structure disclosed in my aforesaid application Serial No. 614,573, whenever the automatic gearshifting means is rendered inoperative from any cause.

Referring now more particularly to the drawings, 1 designates a portion of the instrument board of an automobile, 2 the intake manifold of the automobile engine, 3 a suction pipe or conduit leading from the manifold to the gearshift operating unit hereinafter fully described, 4 a valve in said conduit for closing the same whenever desired, 5 the steering post assembly, 6 a rock shaft forming part of or operated by or from an accelerator-controlled automatic clutch operating device of any suitable type, 7 a manually operable clutch operating lever or pedal, and 8 a spring for normally holding said lever 7 in its clutch-let-in position. As shown, the lever 7 is provided at its lower end with a bearing loop or eye 9 which loosely embraces the shaft 6 and is formed with a segmental slot or recess 9' and stop shoulders 10 and 10a at the opposite ends thereof for engagement with a stop pin or lug 11 on the shaft. The spring 8 operates to normally maintain the lever 7 in its clutch-closing position and serves to return it to such position at the close of each clutch opening and closing movement thereby, and on the shaft 6 is a crank arm 6a for connecting it with a clutch-controlled valve forming part of the gearshift operating unit as hereinafter described. In the normal or clutch-closing positions of the parts 6 and 7 shown in Fig. 1 the lug 11 engages shoulder 10 and forms therewith a clutch connection for transmitting clutch actuating movement to the shaft 6 when lever 7 is manually operated. When shaft 6 is rocked forward, however, for clutch actuation by the automatic clutch operating device the lug 11 moves freely in the recess 9' between shoulders 10 and 10a, thus allowing clutch actuation by the automatic clutch operating device independent of the lever 7.

As shown, a piston 7a is connected with the crank arm 6a by a link or connecting rod 7b and is slidable in a cylinder 7c. The clutch is released by means of suction induced in the cylinder through a pipe 7d connecting the cylinder with the intake manifold 2. In said pipe is a throttle valve 7e operatively coupled to the accelerator 7f in such manner that when the accelerator is released or in normally retracted position the valve will be in open position to apply suction to the cylinder to disengage the clutch against the resistance of the spring 8, and so that when the accelerator is pressed forward for a fuel feed action to the engine the valve 7e will be closed to cut off the suction to the cylinder and thereby allow the piston to be returned to normal position and the clutch to be engaged by the action of the spring 8.

In the drawings I have also shown a conventional or other suitable type of transmission gearing or gearshift mechanism for transmitting motion from the drive shaft 12 of the motor to the propeller shaft 13. The gear casing or housing body 14 and only those parts of the transmission gearing contained therein necessary to a proper disclosure of the invention are shown, to wit, the drive shaft 12, the propeller shaft 13, the transmission shaft 16, the low speed and reverse gear 17 on the shaft 16, a gear 18 on shaft which forms part of a free-wheeling unit, the countershaft drive gear 19 on the shaft 12, the second or intermediate and high speed gear 20 on the shaft 16, and the clutch member 21 for connecting said gear 20 with the shaft 16 and disconnecting the shaft 16 from the gear 19. These gears coact in the well known manner with gears on a countershaft and idler (not shown) to form the working reverse gear couples and first and second speed couples, the clutch 21 and the gear 17 being movable by means of the shifters 22 and 23 respectively for performing the speed change actions, as will be readily understood. A free-wheeling unit, generally indicated at 24, which includes the gear 18, is also shown which rotates constantly with the propeller shaft when the vehicle is in motion and may be employed, when used, as a means for driving a speed controlled governor which operates a speed control valve forming a part of the present invention, as hereinafter fully described.

The gear casing or housing body 14 is normally closed by a head or cover member 25 which is detachably secured in position by screws or other suitable fastening means 26, the removal of which cover member gives access to the housing and parts contained therein. In accordance with my invention, this cover member 25 serves as a body or carrier support in or upon which are formed or mounted all of the motor or vehicle running gearshift operating parts which are supplemental to the aforesaid gearshift elements mounted within the housing or casing 14 and which shift the same for the gearshift actions, so that, with certain exceptions, if desired, the cover member and the parts carried thereby will form a gearshift actuating unit which may be applied to or removed from a car by simply applying thereto or removing therefrom a gear casing cover constructed in accordance with the invention. By this means changes in the form or construction of the housing body 14 or of the gearshift elements mounted therein are rendered unnecessary and the automatic gearshift means may, therefore, be applied for use with any conventional or adopted form of transmission gearing. The certain exceptions noted apply to means for supplying power to the working parts on the cover member, such as suction or pressure lines between the engine and the cover member and clutch, or between such parts and selective control elements on the instrument board or other suitable part of the car, whereby the clutch operating means and parts on the cover member may be automatically or manually operated or controlled, and furthermore the means connected to the vehicle running gear operated means for driving the speed controlled governor so that the governor may continue to operate when the vehicle is coasting and not being driven from the engine. The parts thus noted may vary in form, construction and arrangement as required in installing the invention upon different types or makes of cars and as found to be necessary in view of the character of automatic clutch used and other parts of the equipment of the car. Within the scope of the present invention, however, the shifters 22 and 23 may be mounted as elements of the engine operated automatic gearshift unit under conditions where this may be desirably done.

The cover member 25 preferably comprises a casting, with which are cast the body portions of two working cylinders 27 and 28, arranged at opposite sides and adjacent to one end thereof, said cylinders having respectively arranged therein pistons 27' and 28' carried respectively by sliding stems 27a and 28a. The cylinder 27 and its piston 27' effect the operation of the parts for reverse or first (low) speed shift, while cylinder 28 and its piston 28' effect the operation of the parts for a second or intermediate or third (high) speed shift. Motion is transmitted for these actions from the piston stems 27', 28' to the shifters 22 and 23 through rocker arms or levers 27b, 28b pivotally supported on the cover member. The cylinders and pistons cooperate with channels, passages and ports, together with associated control valves, formed in the pistons and formed in and mounted upon the cover plate in a manner which I will now proceed to describe, whereby the automatic operation of the gearshift elements on the car is effected by power created by or having as its source the automobile engine.

Formed in each working cylinder is a vent or relief passage 29 whose ends are located at opposite sides of the cylinder, and which ends of the passage cooperate respectively with relief or vent ports 30, 30' in the piston stems. In the piston stem 27a of the piston 27' is also a port 30a for coaction with passages 31 and 32, which, together with a transverse channel 33 and other passages 34, 35, 36, 37, 38, 39, 40, and 41 are formed in the upper surface of the body of the cover. The cover is also formed with a transverse chamber 40a and with chambers or cavities 42, 43 and 44 in which are respectively mounted for operation a slidable speed controlled valve 45 and rotary valves 46, 47 and 48.

The valve 46 is a selector valve which is mounted in the chamber 42 and is provided with a diametric port 49, opposite angle ports 50 and 51 intersecting one end of said port 49, and two relief or vent ports 52 and 53. It has a neutral position, as shown in Figs. 5 and 15, in which its ports 50, 51, 52, 53 are blank and its port 49 communicates with the passage 37, and it has two opposite working positions, as shown in Figs. 16 and 17, respectively, for coaction with passages 34, 33 and 37 to control the gearshift mechanism through cylinder 27 and piston 27' for reverse or forward driving actions. The valve 47 mounted in chamber 43 is an emergency by-pass valve having a central diametric port 54, two opposite ports 55 and 56 and a port 57 intersecting the port 55. This valve has a normal position as shown in Fig. 5 in which its ports 55 and 56 communicate with the passages 32, 38, 39 and 41, and it has an emergency operating or by-pass position, as shown in Fig. 14, in which it diverts the flow of fluid from its normal course by closing connection between the passages 39 and 41 and between the passages 38 and 32 and opening communication through port 54 between passages 39 and 32, at the same time establishing a relief or vent connection between passage 41 and atmospheric port 58 through ports 55, 57. This by-pass position of the valve 47 permits movement of the cylinder pistons to effect an instantaneous gear change shift of the gearshift mechanism from high speed to second speed regardless of the action of the speed controlled valve 45 and without waiting for the speed of the car to drop sufficiently to effect such gearshift action in the normal manner, i. e., through the movement of the speed controlled valve 45 by the centrifugal governor hereinafter specifically described. The valve 48 mounted in chamber 44 is a clutch controlled valve power cut-off and let-on having a single diametric port 59 for opening and closing communication between the suction passage 40 and a conduit 60 communicating with the suction line 3.

Valve 48 is normally, that is, when the clutch is engaged, in closed position to cut off communication between the intake manifold and the gearshifter, at which time valve 7e under control of the accelerator is also closed to cut off communication between the intake manifold and the cylinder 7c to prevent power operation of the piston 7a therein, in which position the valve 7e is maintained at all times while the accelerator is being pressed forward for a fuel feed action so that the valve 48 can not be opened to allow speed changes to be effected by power so long as the accelerator pedal is depressed and the clutch is engaged. On the release of the accelerator, valve 7e will be opened to connect the cylinder 7c with the intake manifold so that through suction induced on one side of the piston 7a atmospheric pressure will be allowed to act on the opposite side of the piston for a power shift of the piston to disengage the clutch. When the clutch is disengaged valve 48 which was closed is opened, whereby power operation of the gearshifter is permitted to effect shift of the gears. A manually operable cut off valve 7g is provided for cutting off communication between the manifold and cylinder 7e whenever it is necessary from any cause or it is desired to cut the automatic clutch operating device out of action, in which event the foot pedal 7 may be operated for strictly manual clutch disengaging actions. In addition, a sliding or other type of relief or vent valve 61 is provided for opening and closing communication between the relief or vent passage of each cylinder 27, 28 and the atmosphere, the two valves 61 being coupled for simultaneous operation by crank arms 62 to a transverse rock shaft 63 journaled in bearings upon the forward portion of the cover member 25. On this shaft 63 is also a crank arm 64 coupled by a connecting rod 65 to a crank arm 66 connected to the selector valve 46, whereby when valve 46 is operated the valves 62 will be operated therewith.

The valve 45 is slidably mounted in the chamber 40a, which is disposed beneath the channel 33, and this chamber 40a is connected with said channel through vertical ports 67, 68 and 69 and with the passages 37, 38 and 39 through angle ports 70, 71 and 72, and also connected with the chamber 40a are atmospheric and vent ports 70', 71' and 72', the channel itself being in communication at one end with the passage 40. The valve 45 is provided with two angular suction ports 73 and 74 and three straight vent ports 75, 76 and 77 for coaction with the aforesaid passages 37—39, inclusive, and ports 67 to 72', inclusive. Fig. 11 shows the standing still or retracted position of this valve 45, which is its position when the vehicle is standing still or at rest, while Figs. 12 and 13 respectively show the second and third speed positions of said valve. A spring 78 surrounds one end 79 of the valve between an abutment surface 80 formed by the adjacent side of the plate 25 and a coacting abutment surface formed by a nut 81, which nut serves as a tensioning or adjusting device for adjusting the valve and regulating the resistance of the spring to its speed accelerating movement in the direction toward its opposite end by means of a centrifugal governor 82.

The governor 82 is suitably driven by an element receiving motion from some part of the running gear of the vehicle or a part driven therefrom, such as from the free-wheeling unit located on the driven side of the transmission, or, in the absence of a free-wheeling unit, by a gear located at the point where the said unit is placed, or by means of the speedometer drive gear, so that the governor will always operate when the car is in motion and so that the valve will be controlled by the car speed instead of the engine speed. In the present instance the governor 82 is shown as driven by a worm gear 83 mounted on the free-wheeling unit 24, which gear drives a worm pinion 84 on a governor drive shaft 85 journaled in bearings 86 on the underside of the cover plate 25. The shaft 85 in turn transmits motion through gears 87 and 88 to the rotatable governor shaft 89 which is journaled in bearings 90 on the plate 25 and on which shaft or on a sleeve carried thereby, are pivotally mounted the weighted bell-crank governor arms 91 having cam members 91' arranged to engage a head 92' on the sliding governor stem 92. The outer end of this head is formed with a socket in which is fitted an anti-friction bearing ball 92a which is engaged by the rounded face of one arm 93 of a transmission lever 94 centrally fulcrumed on the stationary governor casing 95 and having its opposite arm 96 pivotally engaging the forked extremity 97 of the outer end 79 of the valve 45, whereby said valve 45 is rendered movable in opposite directions by the counteracting forces of the expansive action of the spring 78 and the movement of the lever under the outward sliding movement of the governor stem 92 and outward radial movements of the weighted governor arms 91. As the governor will always be driven when the vehicle is in motion at speeds varying according to the vehicle speed it will be evident that the valve 45 will be moved outwardly to different degrees by the governor proportionate to the speed of the vehicle, and that it will be moved inward by its retracting spring to different degrees as the speed of the vehicle decreases below a predetermined speed at which the valve is in a predetermined forward position. It will be observed that all parts of the governor, except its driving gear, are mounted on the cover plate and are applicable and removable with and as part of the gearshift unit, and that, as the governor is controlled by vehicle speed instead of engine speed, a proper positioning of the valve 45 at any and every speed is ensured. As also the action of the spring 78 may be varied and regulated by means of its adjusting means 81, the movements of the valve responsive to predetermined movements of the governor may be accurately controlled to secure proper registration of the valve ports and the other ports governed thereby to obtain an accurate and sensitive operation of the parts for proper gearshift operations.

The elements for pneumatically and manually controlling the gearshift mechanism include, in addition to the parts previously described, a fitting 98 connecting the suction pipe 3 with the channel 60, rod 99 coupling the arm 6a of shaft 6 with an arm 99' on the clutch controlled valve 48, whereby on a clutch actuating movement of either the shaft 6 or lever 7 said valve 48 will be opened, as shown in Fig. 12, to connect said pipe 3 and channel 60, a control button or member 100 on the instrument board 1 connected by a cable 101 with an arm 102 on the emergency valve 47 for manually operating said valve when desired, and means for manually rocking the valve shaft 63 comprising a hand lever 103 disposed adjacent the steering wheel on the upper end of a rock shaft 104 journaled in the steering post and carrying at its lower end a crank arm 105 coupled by a connecting rod 106 to a crank arm 107 on the shaft 63 whereby said shaft 63 may be manually operated to selectively operate the valve 46 and at the same time operate the relief or vent valves 61.

A friction check or retarder 105a is preferably provided for coaction with valve 45 to oppose a certain resistance, additional to that of spring 78, to the movement of the valve to higher speed position when it reaches the second speed position. This comprises a ball member 105' on the plate 25 which is adapted for frictional engagement with the outer longitudinal edge of the valve 45 and a longitudinal groove 106' therein, said groove having an abutment shoulder 107' at one end. This ball is forced into engagement with the valve by a spring 108 adjustable as to pressure by means of an adjusting member 109. During the preliminary travel of the valve 45 from standing to second speed position the ball engages the groove 106' and exerts minimum or no frictional pressure on the valve, so that the valve may be moved freely by the governor up to the second speed position. At the second speed limit the shoulder 107' engages the ball and establishes a yielding resistance supplemental to that of the spring 78 to the further or final travel of the valve between second and third speed positions, which resistance must be overcome by the pushing force of the governor on the valve before the valve can be moved to a further degree for a speed change control action from second to high speed. By this means after the valve has been moved by power increases of the governor successively to low and high speed positions and the gearing has been shifted successively to such positions by operations of the clutch, the valve may shift back and forth under varying vehicle speeds between low and second speeds while the transmission is maintained in second gear. At the same time the opposition to further movement of the valve beyond second speed position by the combined forces of the spring 78 and retarding member 105' ensures correct registry of the second speed ports whenever the force of the governor, at proper vehicle speed, is sufficient to move it to such position, and further movement of the valve to high speed position cannot occur until such forces are overcome by increased power of the governor developed when the vehicle speed reaches at least the predetermined minimum speed for high speed gear change. When this predetermined speed is reached shift into high gear may be effected by operation of the clutch and opening of the clutch valve to connect the vacuum line 3 through the valve with the high speed suction channel 39. Improper and unnecessary gearshift actions which might otherwise occur are thus prevented in a simple and effective manner.

I preferably provide throttle valve devices 110 or their equivalent to govern the inflow of atmospheric air into channels 38 and 39 through the ports 70' and 71' in order that the working atmospheric pressures supplied may be regulated and controlled to a nicety and so as to prevent undesirable power pulsations and resulting irregular motions of the elements operated thereby, as well as to make such pressures of the proper degrees required for smooth and regular motions of the working elements and with proper regard to the subnormal or vacuum degrees produced by the suction of the engine, which may vary in the working actions of the engines of different automobiles or the same engine at different times. These valve devices consist, in the present instance, of a casing which may be formed on the head 25 and provided with an air port 111 and a taper-point needle valve 112 in threaded engagement with the casing so that its pointed end may be adjusted to vary the effective size of the port 70' or 71' and regulate the flow of air therethrough to the exact degree required.

The operation is as follows:

To put the car in reverse gear, with the car standing still and the transmission gearing in neutral position, the selector valve 46 is manually moved by operation of the lever 103, whereby through the resulting movement of the rod 106 rock shaft 63 will be actuated to adjust valve 46 from the normal position shown in Fig. 5 to the position shown in Fig. 16. In this position of the valve 46 ports 50 and 49 communicate with passages 37 and 34, thus connecting the channel 33 through said ports and passages with the outer or forward end of cylinder 27 in readiness for the shift. The clutch valve 48 is then opened by actuation of the clutch pedal, thus connecting suction line 3 with channel 60 and channel port 69 communicating with ports 50 and 49 in valve 46, thereby inducing a suctional pull on the forward side of the piston 27', and at the same time establishing communication between the atmosphere and the cylinder 27 in rear of the piston through channel 36 and port 53 of valve 46, whereby the piston 27 will be shifted forwardly to reverse shift position. The selector valve 46 may then be shifted back to either neutral or first speed position. When the selector valve is moved to neutral position, a suction will be induced through passages 37 and 35 to the center of the cylinder 27, whereby piston 27' will be shifted back to neutral position. A vent or atmospheric connection will be provided at this time on the forward side of the piston through the associated plunger valve 61 and piston valve port 30. In these operations valve 45 does not change its position from a standing still position, in which it remains until the car is set into forward motion.

To shift the gearing into first speed, the selector valve 46 is manually moved to first or forward speed position, as shown in Fig. 17, thus connecting ports 51 and 49 of valve 46 with channel 36, a vent or atmospheric connection being at the same time provided through passage 34 and port 52 of valve 46. Upon then depressing the foot pedal or pressing on the accelerator in the use of an automatic clutch, the clutch operated valve will be opened to connect cylinder 27 through the valve 46 with the conduit 3, thus causing movement of the piston 27' to shift the gear to first speed position. As soon as the car starts its forward movement rotation of the governor begins and when the car reaches a speed of from four to five miles per hour, the speed controlled valve 45 will be moved from its standing still position shown in Fig. 11 to its second speed position shown in Fig. 12. In this second speed position communication is established between the conduit 3 through the ports 68, 73 and 71 and the second speed passage and the port 56 of valve 47 and the forward end of the first speed cylinder 27 through the passage 32 and the port 30a in the piston stem 27a, whereby piston 27' will be moved to neutral position. When piston 27' is in neutral position its stem 27a will be in position to close communication with cylinder 27 through port 30a and open communication between channels 32 and 31 and the forward end of the cylinder 28, whereby piston 28' will be shifted to second speed position. When the first speed piston 27' is shifted to neutral position communication with the atmosphere is established through channel 36 and ports 49 and 51 of valve 46 and channel 37 to port 77 in speed controlled valve 45 and the exhaust port 72'. At the same time another vent or atmospheric communication is opened from the second speed cylinder 28 to the atmosphere through line 41, passage 55 in valve 47, line 39 and passage 75 in the speed controlled valve 45. The transmission gearing is thus shifted to second speed position.

In the shift of the gearing from second to third speed, as shown in Fig. 12, the speed controlled valve 45 moves to third speed position at from fourteen to fifteen miles per hour. Communication is thus established through angle port 73 in the valve 45 with passage 39, port 55 of valve 47, passage 41 and the cylinder 28 so that when the clutch valve is operated piston 28' will be shifted from second speed position to third speed position. A vent or atmospheric communication is at the same time provided through the second speed line 38, passage 31, port 30a of piston valve stem 27a, channel 32 through port 56 of valve 47, channel 38 and port 76 in speed controlled valve 45. The car is now in high speed under the control of the governor and control from high speed to low speed may take place in the reverse way.

The auxiliary plunger valves 61 connect with the atmosphere either cylinder which is to be moved into neutral when the selector valve is shifted to neutral position. These valves are operated by the rocker arms on shaft 63 when the selector valve is operated.

The emergency by-pass valve 47 is moved from normal to emergency position only when the car is in high speed and when it is desired to shift into second speed for hill climbing or travel through sand, etc., without waiting for the governor to adjust the speed controlled valve to second speed position. When the emergency by-pass valve is manually operated by its control device 100 on the instrument board and moves through normal to emergency position, it closes communication between passage 41 which was before in communication with the third speed passage 39 and opens communication through port 54 between passages 32, 39 and 31 with the piston cylinder 28, at the same time establishing a vent or atmospheric connection for the third speed side of the piston 28' through ports 58, 55 and 57 in the valve. This permits the cylinder piston 28' to shift the gearing out of high speed and put the same into second speed without regard to the speed of the car or position of the speed controlled valve 45. When it is again desired to shift to high speed it is simply necessary to turn the emergency valve 47 to normal position to restore the high speed working action previously described.

In Figs. 19 to 22, inclusive, I have shown a preferred construction of retarder or stop device which may be employed in place of the retarder 105 for arresting the movement of the speed controlled valve 45 and preventing its movement beyond second speed position in a speed accelerating action until the power of the governor is sufficient to shift it to third speed position preparatory to a shift of the gearing from second to high gear when the clutch is actuated for such a shift. This preferred construction of retarder or stop device is controlled by a moving part of the gearshift mechanism, in the present instance the third speed piston, and comprises a bracket 113 attached to the header in rear of the second and third speed cylinder 28 and having a guide opening 114 therein through which the end of the valve 45 opposite that connected to the governor may pass in the movement of the valve in speed accelerating direction. A bell-crank-shaped detent, retarder or stop device or member 115 is pivoted at the intersection of its arms to the bracket, and one of the arms 116 of this device or member 115 is movable by rocking movements of the member into and out of the path of movement of the valve and into and out of registry with the guide opening 114. The other arm 117 of said device or member is loosely coupled pivotally, as at 118, to a sliding sleeve or collar 119 on a control rod 120. The sleeve is mounted for movement on the rod between a stop member or abutment 121 at the free end of the rod and the rear end of a coiled spring 122, the forward end of which spring bears against a shoulder or abutment 123 at the forward end of the rod. The forward end of the rod is pivotally connected, as at 124, to the rear end of the piston rod 28a of the piston 28' working in the cylinder 28 so that the rod moves with the piston in the gearshift operating movements of the latter. The spring is extended and operates in the neutral and second speed positions of the piston to hold the sleeve 119 and the end of the arm 117 connected therewith in contact with the abutment, as shown in Figs. 19, 20 and 21, while in the third speed position of the piston the spring yields to permit the rod 120 to slide in a rearward direction through the sleeve 119, a yielding or resilient lost-motion sliding connection thus being provided between the piston actuated control rod and the retarder or stop member. The abutments or shoulders are preferably in the form of nuts or like adjustable elements in threaded engagement with or otherwise adjustably mounted on the rod and adapted to be fixed in adjusted position thereon, as by check nuts or other means, so that the tension of the spring and throw or range of movement of the member 115 may be regulated to desired degrees. It will be understood from the foregoing description and by reference to Figs. 19 and 20 that so long as the piston 28' is in neutral position the arm 116 of the member 115 will lie in the path of movement of the valve, which, in its second speed position, will contact with said arm, so that the valve may move backward and forward between its first speed and second speed positions when the car is traveling in first speed gear up to the predetermined speed for the second speed shift, or higher, but cannot move beyond second speed position until the clutch valve is operated and the piston 28' moves to second speed position, as shown in Fig. 21, in which operation of the piston member 115 is rocked to withdraw its arm 116 out of the path of the valve. This prevents faulty and unnecessary shifting of the gearshift operating mechanism due to fluctuating movement of the valve and also prevents a gear change from first speed to second speed until the power of the governor has developed to a proper degree under increasing speeds of the vehicle and a consistent speed suitable for such change speed action has been attained. The use of the retarder or stop device also ensures proper registry of the valve ports for th shift into second speed upon the operation of the clutch valve at any speed above the minimum set for second speed shift, since the retarder will keep the valve in second speed position until it is retracted by the movement of the piston 28' to second speed position. The valve is then free to move to third speed position if and when the car is traveling fast enough for a direct drive. When the retarder is retracted upon the opening of the clutch valve for the change to second speed and movement of the piston 28' to second speed position the arm 116 is disposed beneath the valve, as shown in Fig. 21. On the movement of the valve and piston 28' to third speed position upward movement of the arm 116 to stop position is prevented by reason of the fact that the valve overrides the arm and the rod 120 slides freely through the sleeve to permit unobstructed rearward movement of the piston, as shown in Fig. 22, spring 122 yielding to permit such action. When the valve again moves back to first speed position and the piston 28' returns to neutral position the stop member 115 again returns to the stopping position shown in Fig. 20.

From the foregoing description, taken in connection with the drawings, the construction and mode of operation of my improved automatic transmission or gearshift for automobiles and like vehicles will be readily understood, and it will be seen that the invention provides a structure of this character which is simple, reduces the number of parts commonly required to perform the same operations, is adapted for use on any conventional type of transmission, and may be employed in connection with either an ordinary manually operated or automatic clutch, accordingly as it is desired to make the transmission actions partly or wholly automatic. By employing fluid lines which serve both as feed or suction and vent lines, together with a cooperating speed controlled valve, whereby the number of passages and auxiliary valves employed are reduced to the minimum, a type of apparatus is provided which will operate with great efficiency, reliability and accuracy and is not liable to stall or become inoperative in use. As the speed controlled governor valve is controlled in its movements in one direction by an actuating spring, whose working action may be regulated, a working adjustment of the valve for securing accuracy of operation may at all times be performed, and as its controlling governor is driven from a part of the drive mechanism on the driven side of the transmission, it will be evident that the automatic governor valve and the transmission mechanism are controlled by vehicle speed instead of the engine speed, rendering the automatic operation of the transmission positive and reliable at all times. An important but not essential feature of my invention resides in the fact that all the elements operating the gearshift mechanism are formed in or carried by the transmission cover member, thus providing a transmission controlled mechanism which is of unitary character and which may be applied to or removed from a vehicle by simply applying or releasing the transmission cover to or from the transmission casing, thus saving time in installation or removal of such parts for inspection, cleaning or repairs. The working operation of the speed controlled valve is also such that it may be used in connection with any type of automatic clutch now in use.

Other and important advantages of the invention are (1) the provision of means for putting the gearshift into neutral when the motor is stalled at any speed without the use of an auxiliary valve; (2) the provision of the by-pass valve for emergency shift from high to second speed regardless of the speed of the car; (3) the provision of means for securing progressive automatic speed change from first speed to high speed, or the reverse, without the necessity of operating selective control devices and without the need of auxiliary valves for the purpose; (4) the provision of means whereby the piston of the reverse and low speed cylinder operates as a valve to control suction and vent lines leading to the high speed cylinder for actuation of the high speed piston, whereby simplicity of construction and further reduction in the number of working parts is secured; (5) the provision of the retarding means governing the movement of the speed controlled valve from second speed to high speed position, whereby unreliability of valve action at this stage is prevented; and (6) the provision of means for regulating the inlet of atmospheric air to the conduits 38 and 39 through the ports 70' and 71' so as to properly govern the application of the working air pressures proportionate to the working suction pulls induced.

As stated, means, such as shown in my aforesaid application Serial No. 614,573, may be employed to permit of the use of a gearshift lever of conventional type to enable the gearing to be manually shifted in the usual way in the event that the automatic change speed mechanism should be rendered inoperative from any cause. Also by slight modification the structure may be designed to use compressed air supplying means instead of vacuum producing means as the source of power for operating the gearing.

While the structure disclosed for purposes of exemplification is preferred, it will, of course, be understood that changes in the form, construction and arrangement of the parts of the apparatus may be resorted to within the scope of the appended claims, without departing from the spirit or sacrificing any of the advantages of the invention.

What I claim is:

1. In a pneumatic gearshift, a gearshift operating mechanism, fluid pressure operated means for shifting the gearshift operating mechanism for reverse or first speed shift actions, fluid pressure operated means for shifting the gearshift operating mechanism for second or third speed shift actions, manually operable means for selectively controlling the first-named shifting means for reverse or first speed shift actions, means controlled by movement of the vehicle for securing automatic change over from the first-named to the second-named shifting means for shifting from first to second and second to third speed, and vice versa, and means for effecting a change over shift of the second-named means from third speed to second speed while the fourth-named means is under speed control for a third speed gearshift governing action thereof.

2. In a gearshift for vehicles, a gearshift mechanism, a fluent power operated power mechanism for actuating the same, automatic means including a control element governed by vehicle movement for controlling the application of power to the power mechanism for shifting the gearshift mechanism to low, intermediate and high speed positions, and manually controlled means including a control element movable independently of the first-named control element to divert the application of power for effecting a shift from high to an intermediate speed shift regardless of the movements of the first-named control element responsive to the speed of the car.

3. In a gearshift for vehicles, a gearshift mechanism, fluid pressure means including a speed control valve governed by vehicle movement for governing the flow of fluid pressure to the shift mechanism for shifting said mechanism from low speed to intermediate and high speeds and vice versa, and a manually operable valve movable independently of said control valve to vary the flow of fluid pressure to the shift mechanism for shifting said mechanism from high speed to a lower speed without regard to the position of said control valve.

4. In a pneumatic gearshift, a gearshift mechanism, fluid pressure operated activating means therefor, means including a valve for shifting said mechanism from low speed to intermediate and high speeds and vice versa, a spring for moving said valve in one direction, a power means operated by the driven line of the vehicle drive gear for effecting movement of the valve for speed changing actions against the resistance of the spring in the opposite direction, and means effective when the valve moves to second speed position in a speed accelerating direction for applying a retarding force against movement of the valve to high speed position under the force of the power means without opposing a retarding force to the movement of the valve in the reverse direction.

5. In a gearshift mechanism for automobiles, a gearshift casing, gearshift mechanism therein including motion transmitting members for imparting gearshift motions thereto, and a power actuated gearshift operating device including a support forming a cover or head for the casing, power mechanism carried by said support, embodying a means adapted to be operated by a running part at the driven side of the gearshift mechanism and members for transmitting motion to said motion transmitting members, said members of the gearshift mechanism being respectively engageable with and disengageable from the motion transmitting members in the casing in the application of the cover or head to and its removal from the casing, and said cover or head and parts carried thereby forming a gearshift operating unit applicable to and removable as such from the casing.

6. In a power operated gearshift for motor vehicles, a gearshift operating mechanism, a shiftable power control device governed by movement of the vehicle for automatically controlling the operation of the gearshift mechanism to effect an automatic shifting of the gearing to different speed positions, and a manually operable rotary power control device separate from and movable independently of said power control device and operable while the latter is in action for a high speed gearshift for a power control action to effect a shifting of the gearing from high speed to a lower speed.

7. In a gearshift for motor vehicles, a power operated gearshift operating mechanism, a primary control device governed by movement of the vehicle and controlling the power operation of the gearshift operating mechanism to effect automatic shifts of the gearing to different speed positions, and a secondary control device separate from and manually shiftable independently of said primary control device and operative while the latter is in action for a certain speed gearshift to govern the power operation of the gearshift operating mechanism to shift the gearing to a different gearshift.

8. In a gearshift for motor vehicles, a gearshift operating mechanism, a manually operable rotary control device selectively governing the power operation of the gear shift operating mechanism for shifting the gearing for reverse or for low speed, a control device governed by the movement of the vehicle and governing the power operation of the gear shifting mechanism to effect an automatic shifting of the gearing to different speed positions, and a manually operable rotary control device movable independently of the vehicle movement governed control device for governing the power operation of the gear shifting mechanism for shifting the gearing from high speed to a lower speed.

9. In a motive fluid operated gearshift for motor vehicles, a gearshift operating mechanism, selective means governing the flow of the motive fluid for shifting the gearing for reverse or for low speed, a device separate from and independent of said selective means and governed by the movement of the vehicle and coacting with the selective means when the latter is in a low speed position for governing the flow of the motive fluid to effect an automatic shifting of the gearing to different higher speed positions, and an emergency shift selective device separate from and movable independently of the vehicle movement governed control device and disposed in the line of flow of the motive fluid between the same and the operating mechanism for manual coaction with the speed controlled device in effecting said higher speed shifts, said emergency shift control device being shiftable from a normal position to govern the flow of the motive fluid for actuating said operating mechanism to shift the gearing from high speed to a lower speed.

10. In a gearshift for motor vehicles, a gearshift operating mechanism, a device governed in action by the movement of the vehicle for controlling the power operation of the gearshift operating mechanism to effect an automatic shifting of the gearing to different speed positions, and manually controlled means governing the power operation of the gear shifting mechanism to shift the gearing from high speed to a lower speed without regard to the power control action of said vehicle movement governed device.

11. In a pneumatic gearshift mechanism for motor vehicles, a gearshift operating mechanism including a primary fluid pressure operated motor to actuate said mechanism for reverse and low speed gearshifts and a secondary fluid pressure operated motor for actuating said mechanism for intermediate and high speed gearshifts, said primary motor including a movable part having a port therein to control the flow of fluid to said primary motor to shift the reverse and first speed gears from first speed to neutral and then to said secondary motor to shift the second and high speed gears from neutral to second speed.

12. In a pneumatic gearshift for motor vehicles, a gearshift mechanism including a primary cylinder and piston for reverse and low speed gearshifts and a secondary cylinder and piston for intermediate and high speed gearshifts, a system of conductors connecting said cylinders with a fluid pressure producing source and the atmosphere, said conductors including feed and vent ports in each cylinder and piston and a passage extending through a part of the piston in the primary cylinder for the flow of fluid through said cylinder and piston to effect a shift of said piston from first speed to neutral position and then to the second cylinder and piston for shift of the latter-named piston from neutral to second speed position, a selector valve controlling the flow of fluid to the primary cylinder for selective reverse and low speed gearshifts, and a speed controlled valve controlling the flow of fluid to said cylinders for effecting automatic forward speed gearshift actions.

13. In a pneumatic gearshift for motor vehicles, a gearshift mechanism including a primary cylinder and piston for reverse and low speed gearshifts and a secondary cylinder and piston for intermediate and high speed gearshifts, said primary cylinder having ports therein and said primary piston having a cooperating port, and means controlling the supply of fluid pressure to said primary cylinder for a first speed to neutral shift and to said secondary cylinder for a neutral to second speed shift through said ports in the primary cylinder and piston.

14. In a fluid pressure operated gearshift for motor vehicles, a gearshift operating mechanism including a primary cylinder and piston for reverse and low speed gearshifts, a secondary cylinder and piston for intermediate and high speed gearshifts, a main conduit for connection with a fluid pressure producing source and branch conduits for connecting said cylinders with said main conduit and the atmosphere, a valve selectively controlling the flow of fluid to said primary cylinder for low speed or reverse gearshifts, a clutch operated valve controlling communication between the main conduit and the branch conduits, a vehicle movement governed valve controlling communication between the clutch operated valve and the branch conduits and between said branch conduits and the atmosphere, and a valve controlling communication between the source of fluid pressure and the secondary cylinder for an emergency high to second gearshift.

15. In a motive fluid operated gearshift for motor vehicles, a gearshift operating mechanism, a valve device governed by movement of the vehicle and controlling the flow of motive fluid to effect an automatic shifting of the gearing to different speed positions, and a manually operable valve device movable independently of the vehicle movement governed valve device and interposed in the line of flow of the motive fluid between the same and the gear operating mechanism for varying the flow of motive fluid to shift the gearing when in high speed to a lower speed.

16. In a pneumatic gearshift for motor vehicles, a gearshift mechanism including a primary cylinder and piston for reverse and low speed gearshifts and a secondary cylinder and piston for intermediate and high speed gearshifts, a system of conductors for connecting said cylinders with a fluid pressure producing source and the atmosphere, said conductors including feed and vent ports in each cylinder and piston and a passage extending through a part of the piston in the primary cylinder for first controlling the application of fluid to said cylinder to effect movement of its piston from first speed position to neutral position and then controlling the application of fluid to the second cylinder to effect movement of its piston from neutral to second speed position in a first to second speed gear change action, and manually operable and vehicle movement controlled means for selectively and automatically controlling the flow of fluid to said cylinders and pistons for effecting such gearshift actions.

17. In a pneumatic gearshift, a gearshift operating mechanism including primary and secondary cylinders and pistons for respectively operating the same for reverse and first speed shift actions and for second and high speed shift actions, fluid supply and exhaust conductors, and valve mechanism including controlling ports in the primary cylinder and piston controlling said conductors for supply of fluid pressure to the cylinders for shift actions.

18. In a pneumatic gearshift, a gearshift operating mechanism, fluid pressure operated means for shifting the gearshift operating mechanism for reverse or first speed shift actions, fluid pressure operated means for shifting the gearshift operating mechanism for second or third speed shift actions, and means controlled by movement of the vehicle and including a piston forming part of the first-named means and having a controlling port therein for securing automatic change over from the first-named to the second-named shifting means.

19. In a pneumatic gearshift, fluid pressure operated means for shifting the gearshift operating mechanism for reverse or first speed shift actions, fluid pressure operated means for shifting the gearshift operating mechanism for second or third speed shift actions, the first-named means including a valve controlled thereby to control the flow of fluid pressure to the second-named means in shift actions thereof from first to second speed, a valve governing said means for effecting such shift actions and coacting therewith to automatically effect neutralizing of the gearshift operating mechanism between shift changes, and means for controlling said governing valve responsive to vehicle movement.

20. In a pneumatic gearshift, a gearshift operating mechanism, a valve controlling the flow of fluid pressure to the gearshift mechanism to effect speed changes thereof, a controller for operating said valve, driving means on the driven side of the gearshift mechanism for governing the controller responsive to vehicle movement, a device for arresting movement of said valve at an intermediate speed stage in speed accelerating direction, and means controlled by a moving part of the gear shifting mechanism for retracting said device.

21. In a gearshift for vehicles, a gearshift mechanism, automatic means responsive to movement of the vehicle for shifting the gearshift mechanism between low, intermediate and high speed positions, and manually controlled means shiftable independently of said automatic means for effecting an emergency instantaneous shift from high to an intermediate speed shift regardless of the action of said automatic means or of the speed of the car.

22. In a gearshift for vehicles, a gearshift mechanism, pneumatic means including a valve responsive to vehicle movement for shifting said mechanism from low speed to intermediate and high speeds and vice versa, and a manually operable valve for shunting the flow of fluid pressure serviced by the first-named valve and controlling said pneumatic means for effecting a gearshift from high speed to a lower speed independent of vehicle speed.

23. In a pneumatic gearshift, a gearshift mechanism, selector valve means including a valve responsive to vehicle speeds for shifting said mechanism from a certain speed to a different speed and vice versa, a spring for moving said speed responsive valve in one direction, a controller in the driven line of the vehicle drive gear for moving the speed responsive valve in the opposite direction, and means for controlling the movement of the speed responsive valve in accelerating direction under the governing action of the controller.

24. In a gearshift for autovehicles, the combination of a fluid pressure operated power mechanism for shifting the gears, a valve governed by movement of the vehicle for controlling the flow of pressure to the power mechanism for effecting different forward speed gearshifts, and a separate, manually operable valve shiftable independently of and during the speed influenced movements of the vehicle movement governed valve for varying the flow of pressure to the power mechanism established by said vehicle movement governed valve so as to effect an instantaneous shift from a high gear ratio established by the vehicle movement governed valve to a lower gear ratio without regard to the speed influenced control action of the speed controlled valve.

25. In a gearshift for auto vehicles, the combination of a fluid pressure operated power mechanism for shifting the gears, a valve governed by movement of the vehicle for controlling the flow of pressure to the power mechanism for effecting different forward speed gearshifts, and a manually operable emergency shift valve interposed in the line of flow of pressure between the vehicle movement governed valve and the power mechanism and operative in a high speed control position of the vehicle movement governed valve to vary the flow of pressure established thereby to effect a shift change of the gearing to a lower gear.

26. In a fluid pressure operated gearshift mechanism, power means for shifting the gears, a valve governing the power means for forward speed gear shifting actions, a vehicle movement controlled device governing said valve, a retarder for temporarily arresting the speed accelerating action of the valve when said valve is in second speed control position, and means controlled by a moving part of the power means for controlling said retarder.

27. In a fluid pressure operated gearshift mechanism, power means for shifting the gears, a speed controlled valve governing the power means for forward speed gearshift actions, a mechanical governor for operating said valve, a retarder movable into and out of the path of the valve for arresting its movement under the action of the governor when said valve is in second speed position, and means controlled by a moving part of the power means for controlling said retarder.

28. In a fluid pressure operated gearshift mechanism, power means for shifting the gears including a primary cylinder and piston for reverse and first speed gearshifts and a secondary cylinder and piston for second and third speed gearshifts, a valve governing the power means for forward speed gear shifting actions, a controller governed by vehicle movement for controlling the action of said valve, a retarder for temporarily arresting the speed accelerating action of the valve under the governing action of the controller when said valve is in second speed controlling position, and means controlled by the piston of the secondary cylinder for controlling said retarder.

29. In a fluid pressure operated gearshift mechanism, power means for shifting the gears including a primary cylinder and piston for reverse and first speed gearshifts and a secondary cylinder and piston for second and third speed gearshifts, a valve governing the power means for forward speed gear shifting actions, a controller governed by vehicle movement for controlling the action of said valve, a retarder movable into and out of the path of the valve for arresting its movement under the action of the controller when said valve is in second speed control position, and means controlled by the piston of the secondary cylinder for controlling said retarder.

30. In a fluid pressure operated gearshift mechanism, a fluid pressure operated, power means for shifting the gears, a valve governed in action by vehicle movement and governing the power means for forward speed gear shifting actions, a retarder for temporarily arresting movement of the valve in speed accelerating direction when said valve reaches second speed position, means controlled by a moving part of the power means for controlling said retarder, and a control valve for admitting or preventing operation of the power means by control action of said vehicle movement governed valve.

31. In a fluid pressure operated gearshift mechanism, a fluid pressure operated power means for shifting the gears including a primary cylinder and piston for reverse and first speed gearshift actions and a secondary cylinder and piston for second and third speed gearshift actions, a valve governed in action by vehicle movement and governing the power means for forward speed gear shifting actions, a retarder for temporarily arresting movement of the valve in speed accelerating direction when said valve reaches second speed position, means controlled by the piston of the secondary cylinder for controlling the retarder, and a control valve for admitting or preventing operation of the power means by control action of said vehicle movement governed valve.

32. In a vehicle driving mechanism, a power operated variable speed gear, a clutch, a vehicle motion responsive device shiftable to different speed positions controlling the power operation of the variable speed gear for effecting speed changes, means for limiting movement of the vehicle motion responsive device to second speed position in a speed accelerating action, and means for permitting movement of said vehicle motion responsive device to a higher speed position on actuation of the clutch for second speed shift.

33. In a vehicle driving mechanism, a power operated variable speed gear, a clutch, a movable speed controlled device controlling the power operation of the variable speed gear for effecting speed changes, means for limiting the movement of the speed controlled device to second speed position in a speed accelerating action, and means for permitting movement of said device to a higher speed position on actuation of the clutch for second speed shift.

34. In a vehicle driving mechanism, a power operated variable speed gear, a clutch, a vehicle motion responsive device governing the power operation of the variable speed gear for speed changes, means for rendering said device ineffective for shift of the gear from second speed to a higher speed in a speed accelerating action, and means for permitting action of said device to effect the shift of the gear to a higher speed on actuation of the clutch for second speed shift.

35. In a vehicle driving mechanism, a fluid pressure operated variable speed gear, a clutch, a movable speed controlled device controlling the fluid pressure operation of the gear for speed changes, means for limiting the movement of the speed controlled device to second speed position in a speed accelerating action, and means for permitting movement of said device to a higher speed position on actuation of the clutch for second speed shift.

36. In a vehicle driving mechanism, a power operated variable speed gear, a clutch, a vehicle motion responsive device shiftable to positions for controlling the power operation of the gear for speed changes, means for limiting the movement of the vehicle movement controlled device to second speed position in a speed accelerating action, and means controlled by a moving part of the variable speed gear for permitting movement of said device to a higher speed position on actuation of the clutch for second speed shift.

37. In a vehicle driving mechanism, a gear shifter, fluid pressure operated means for actuating the gear shifter including a device for shifting gears for high and intermediate speeds, a vehicle motion responsive valve governing the fluid pressure operation of the gear shifting means for effecting gear shifting actions at different speeds, a stop for arresting the movement of said valve in speed increasing direction beyond second speed position, while permitting movement of said valve in both directions in other speed changes, a releasing member for shifting the stop to releasing position, and coupling means for connecting the stop member with and disconnecting it from the releasing member.

38. In a gearshift for motor vehicles, a gearshift operating mechanism, power operated means for actuating the same, a set of power control elements for controlling the power operation of the power operated means, a shiftable device governed in movement by the movement of the vehicle for automatically controlling the control actions of said power control elements and the operation of said power operated means for actuating said gearshift operating mechanism to effect an automatic shifting of the gearing to different speed positions, and means movable independently of and without interference with the shifting movements of said shiftable vehicle movement governed device for controlling the power control actions of said power control elements and the operation of said power operated means for shifting the gearing from one speed to another.

39. In a gearshift for motor vehicles, a gearshift operating mechanism, fluid pressure operated power means for actuating the same, a valve device governed by movement of the vehicle and controlling the flow of fluid pressure to the power means for actuating said gear shifting mechanism to effect an automatic shifting of the gearing to different speed positions, and a valve device movable independently of and without interference with the movements of the vehicle movement governed valve for controlling the flow of fluid pressure to the power means for actuating said gearshifting mechanism to shift the gearing from high speed to a lower speed regardless of the action of said vehicle movement governed valve.

40. In a gearshift for motor vehicles, a fluid pressure power operated gearshift operating mechanism, a manually operable selector valve governing the operation of the gearshift operating mechanism for shifting the gearing for reverse or for low speed, a valve governed by movement of the vehicle and controlling the operation of the gearshift operating mechanism to effect an automatic shifting of the gearing to different speed positions, and a manually operable valve movable independently of the vehicle movement governed valve for controlling the operation of the gearshift operating mechanism to effect shifting of the gearing from high speed to a lower regardless of the speed controlling position of said vehicle movement governed valve.

41. In a gearshift for motor vehicles, a power operated gearshift operating mechanism, selective means governing the power operation of the gearshifting mechanism for shifting the gearing for reverse or for low speed, a device separate from and independent of said selective means and governed by movement of the vehicle for controlling the power operation of the gearshifting mechanism to effect an automatic shifting of the gearing to different speed positions, and means movable independently of the vehicle movement governed device and while the latter is in action for controlling the power operation of the gearshifting mechanism for actuating said gearshifting mechanism to shift the gearing from one speed to another without regard to the action of said vehicle movement governed device.

42. In a fluid pressure operated gearshift for motor vehicles, a gearshift operating mechanism, a manually operable selector valve governing the flow of fluid pressure to the gearshift operating mechanism for shifting the gearing for reverse or for low speed, a valve device governed by vehicle movement and controlling the flow of fluid pressure to the gearshift operating mechanism to effect an automatic shifting of the gearing to different speed positions, and a manually operable valve device interposed in the line of flow of fluid pressure between the gear shifting mechanism and the vehicle movement governed valve device for varying the operation of said gear shifting mechanism to shift the gearing from high speed to a lower speed without regard to the speed controlling position of said vehicle movement governed valve device.

43. In a fluid pressure operated gearshift mechanism for motor vehicles, a gearshift operating mechanism including a primary fluid pressure operated motor for actuating said mechanism for reverse and low speed gearshifts and a secondary fluid pressure operated motor for actuating said mechanism for intermediate and high speed gearshifts, and means for controlling the flow of fluid pressure to said primary and secondary motors for shift actions, said means including a fluid pressure control member operative by the primary motor when the primary motor is in first speed position to control the flow of fluid to said primary motor to return the same to neutral position and then operative by the primary motor to control the flow of fluid pressure to said secondary motor to move the same from neutral to second speed position.

44. In a fluid pressure operated gearshift for motor vehicles, a gearshift mechanism including a primary cylinder and piston for reverse and low speed gearshifts and a secondary cylinder and piston for intermediate and high speed gearshifts, a system of conductors in communication with the cylinders, said conductors including feed and vent ports in each cylinder and piston and a passage extending through a part of the piston in the primary cylinder for first controlling the flow of fluid pressure to said cylinder to effect movement of its piston from first speed position to neutral position and then controlling the flow of fluid pressure to the second cylinder to effect movement of its piston from neutral to second speed position in a first to second speed gear change action, and means controlling the flow of fluid pressure through said conductors to said cylinders and pistons for effecting such gear shift actions.

45. In a pneumatic gearshift for motor vehicles, a gear shift mechanism including a primary cylinder and piston for reverse and low speed gearshifts and a secondary cylinder and piston for intermediate and high speed gearshifts, each of said pistons being movable from a neutral position in its cylinder in opposite directions for gearshift actions, and means controlling the flow of air to and from the cylinders for shift actions of the pistons therein, said means including a part of the piston of the primary cylinder constructed to act as a valve for successively connecting the primary and secondary cylinders for flow of air to shift the piston in the primary cylinder from first speed to neutral position and to shift the piston in the secondary cylinder from neutral to second speed position.

46. In a fluid pressure operated gearshift for motor vehicles, a gearshift operating mechanism including a primary cylinder and piston for reverse and low speed gearshifts, a secondary cylinder and piston for intermediate and high speed gearshifts, a fluid pressure supply and exhaust system including a main conduit and branch conduits for connecting said cylinders with said main conduit and the atmosphere, a valve in said system selectively controlling the flow of fluid pressure to said primary cylinder for low speed or reverse gear shifts, a clutch operated valve in said system controlling communication between the main conduit and the branch conduits, and a governor operated speed controlled valve in said system separate from and controlling communication independent of the first-named valve between the clutch operated valve and the branch conduits and between said branch conduits and the atmosphere.

47. In a fluid pressure gearshift for motor vehicles, a gearshift operating mechanism including a primary cylinder and piston for reverse and low speed gearshifts, a secondary cylinder and piston for intermediate and high speed gearshifts, a fluid pressure supply and exhaust system including a main conduit and branch conduits connecting said cylinders with said main conduit and the atmosphere, a valve in said system selectively controlling the application of pressure to said primary cylinder for low speed or reverse gear shifts, a clutch operated valve in said system controlling pressure flow communication between the main conduit and the branch conduits, a vehicle movement governed speed control valve in said system controlling communication between the clutch operated valve and the branch conduits and between said branch conduits and the atmosphere, and a manually operable valve in said system controlling the flow of fluid pressure to the secondary cylinder for shifting the piston therein from high speed to second speed position without regard to the action of the vehicle movement governed valve.

48. In a fluid pressure operated gearshift for motor vehicles, a gearshift operating mechanism including a primary cylinder and piston for reverse and low speed gearshifts, a secondary cylinder and piston for intermediate and high speed gearshifts, a fluid pressure supply and exhaust system including a main conduit communicating with said pressure producing means, and branch conduits connecting said cylinders with said branch conduit and the atmosphere, said branch conduit including passages in and controlled by the piston of the primary cylinder for connecting the secondary cylinder therethrough for an emergency control shift, a valve selectively controlling the flow of fluid pressure to said primary cylinder for low speed or reverse gearshifts, a clutch operated valve controlling communication between the main conduit and the branch conduit, a vehicle movement governed valve controlling communication between the clutch operated valve and the branch conduits and between said branch conduits and the atmosphere, and a manually operable emergency valve for controlling communication through said emergency passages and the branch passages for varying the flow of fluid pressure to shift the piston of the secondary cylinder from high speed to intermediate speed position without regard to the controlling action of the vehicle movement governed valve.

49. In a pneumatic gearshift, a gearshift operating mechanism including fluid pressure operated motors for respectively operating the motors for reverse and first speed shift actions and for second and high speed shift actions, and valve mechanism controlling the flow of fluid pressure to said motors and comprising a manually operable selector valve for effecting selective reverse and first speed gearshifts, a vehicle movement governed valve for effecting automatic speed shifts from first to high speed and vice versa, and a manually operable emergency valve for effecting shift from high speed to a lower speed independent of the action of the vehicle movement governed valve.

50. In a pneumatic gearshift for motor driven vehicles, a gearshift operating mechanism, fluid pressure operated means for shifting the gearshift operating mechanism for reverse or first speed shift actions, fluid pressure operated means for shifting the gearshift operating mechanism for second or third speed shift actions, the first-named means having means to control the action of fluid pressure on the second-named means to effect neutralization of the first speed gears and shift of the second speed gears from neutral to second speed in shift actions from first to second speed, a speed controlled valve governing the fluid pressure operation of said first and second-named means for effecting such shift actions and coacting therewith to automatically effect neutralizing of the gearshift operating mechanism between shift changes, and vehicle movement operated power means in the driving line between the running gear of the vehicle and the gearshift mechanism and on the driven side of the latter for controlling the valve.

51. In a pneumatic gearshift, a gearshift operating mechanism, a valve means controlling the fluid pressure operation of the gearshift mechanism to effect speed changes thereof, a controller operable by vehicle movement for influencing said valve means to effect different automatic speed changes in both speed increasing and decreasing directions, and manually operable means for arbitrarily influencing said valve means to obtain a different gearshift from that effected by a controller influenced action of the valve means.

52. In a pneumatic gearshift for vehicles, a gearshift operating mechanism, a valve governed by vehicle movement for shifting said mechanism between low, intermediate and high speed positions, a clutch, means for opening and closing the clutch and simultaneously rendering the gearshift mechanism responsive and non-responsive, respectively, to control actions of the vehicle movement governed valve, and means effective when the vehicle movement governed valve reaches second speed position in speed accelerating direction for opposing movement of said valve from second speed to a high speed position in the travel of the vehicle within a determined speed range in second gear, said means being inactive in the reverse direction of movement of said valve.

53. In a vehicle driving mechanism, a power operated gearshift, a clutch, a vehicle movement controlled device governing the power operation of the gearshift for effecting speed changes, means for limiting the movement of said device to an intermediate speed position in a speed accelerating action, and means for rendering said limiting means ineffective and permitting movement of said device to a higher speed position on actuation of the gear shift.

54. In a vehicle driving mechanism, a power operated gearshift, means controlling the power operation of the gearshift for effecting different speed shifts including a vehicle movement governed device shiftable to positions for effecting intermediate and high speed shifts at vehicle speeds above a predetermined vehicle speed, and means for maintaining said device in one or the other of said positions to which it has been moved at one of such speeds, regardless of a change of vehicle speed, and permitting movement of said device for a shift change when the gears are in a particular speed position.

55. A power operated variable gearshifter having a clutch and power control means governing the power actuation of the gearshifter for different shift changes, said control means including vehicle movement influenced means for effecting intermediate and high speed shifts at vehicle speeds above a predetermined speed, and means for restraining said vehicle movement influenced means from effecting a shift change from one of said shifts to the other under change influencing vehicle speeds while the clutch is engaged and relieving said means from such restraint when the gears are in a particular speed position.

56. A power operated variable gearshifter having a clutch and fluid pressure power control mechanism governing the power actuation of the gearshifter for different shift changes, said control mechanism including vehicle movement influenced valve means shiftable to positions for effecting intermediate and high speed shifts at vehicle speeds above a predetermined speed, and means for preventing shift of said valve means from one of said speed determining positions to another in a particular position of the gearing and permitting such shift when the gearing is shifted.

57. Speed change mechanism for motor driven vehicles having speed accelerating and decelerating means and a clutch for connecting the speed change mechanism with and disconnecting it from the driving motor, power mechanism embodying controlling means operatively controlling the speed change mechanism for effecting different speed changes on successive declutching actions accompanied by acceleration, said controlling means including means governed by vehicle movement as to positions for controlling the power mechanism to effect intermediate and high speed shift changes at predetermined vehicle speeds, said means being inoperative regardless of vehicle speed for a shift change thereof from one position to another in a particular position of the gearing, but rendered operative for a shift change thereof by a shift change of the gearing.

58. A fluid pressure operated gearshift having a clutch, a gear shifting piston, selector means including movable valve means to apply fluid pressure to different sides of the piston in different positions of the selector, a second control means operative only in certain positions of the valve means for alternately effecting one or the other of said fluid pressure applications on said pistons, means for restraining movement of the selector means when in a predetermined position, a governor, means controlled thereby and by the restraining means for changing the selector means to different positions, and means operated with the gears to control the action of the said restraining means.

59. A power operated shifter having a clutch, a transmission, a governor, fluid pressure operated shifter, selector valve means controlling the fluid pressure operation of the shifter, said selector valve means being controlled by the governor, and means released by engagement of the gears in a particular speed position for controlling movement of the selector valve means by the governor.

60. A fluid pressure operated gear shifting mechanism for use with a transmission having a clutch, comprising selector valve means controlling the fluid pressure operation of the shifter in accordance with the position of the selector valve means, means controlled by disengagement of the clutch also controlling the fluid pressure operation of the shifter, and means released by engagement of the gears in a particular speed position for controlling movement of the selector valve means.

61. A power operated gear shifting mechanism for use with a transmission having a clutch and shiftable speed-changing gear elements, comprising a device controlled by the vehicle speed, fluid pressure operated gear shifting means and control valve means therefor, restraining means released by operation of the gears for preventing certain changes in the control valve means, and means controlled by the vehicle speed controlled device for controlling said changes when the clutch is disengaged.

62. A speed change gearing for vehicles embodying pneumatic motor means for effecting different speed shifts of the gearing, valve mechanism controlling the action of said motor means, and a control device operable while said valve mechanism is in action to control the motor means to effect a shift from the highest speed setting determined by the valve mechanism to a lower speed gear setting.

63. In a vehicle driving mechanism, a gearshift, a fluid pressure operated means for actuating the gearshift, a clutch, fluid pressure operated means for actuating the clutch, means for controlling the fluid pressure operation of the clutch actuating means, a valve mechanism governing the fluid pressure operation of the gearshift actuating means, speed controlled means governing said valve mechanism for effecting normal gearshift actions at different vehicle speeds, and means for nullifying the control action of the speed control means and manually controlling the fluid pressure operation of the gearshift actuating means independent of the speed controlled valve for shift changes of the gearing to an intermediate speed gear when the gearshift is in high gear.

64. Shifting mechanism for an automobile transmission mechanism having shiftable speed changing elements, comprising actuating mechanism differently operative upon said elements to effect different forward drive speed changes, speed responsive means for automatically controlling said actuating mechanism for speed accelerating or decelerating changes, and means manually operable independently of the speed responsive means for effecting a forward drive speed changing operation of said actuating mechanism without regard to the action of said speed responsive means.

65. Shifting mechanism for an automobile transmission mechanism having shiftable speed changing elements, comprising actuating mechanism operative upon said elements to effect different forward drive speed changes, speed responsive means for controlling the operation of said actuating mechanism for forward drive speed changes automatically according to speed, means manually operable independently of said speed responsive means and without regard to the action thereof for selectively setting the actuating mechanism for a forward drive speed change, and means for visually indicating the setting of the shifting mechanism for different speed changes.

66. Shifting mechanism for an automobile transmission mechanism having shiftable speed changing elements, comprising actuating mechanism differently operative upon said elements to effect different forward drive speed changes, speed responsive means for automatically controlling said actuating mechanism for speed accelerating or decelerating speed changes, means for automatically restoring said elements to neutral positions in shift change actions, and means manually operable independently of said speed responsive means to selectively effect a forward drive speed changing operation of the actuating mechanism and the restoring of said elements to neutral position regardless of the action of the speed responsive means.

67. In a pneumatic gearshift, a gearshift operating mechanism, a valve means controlling the fluid pressure operation of the gearshift mechanism to a reverse shift or to effect variable speed forward drive shifts, a device operable by vehicle movement for controlling said valve means to effect different automatic forward drive speed changes in both speed increasing and decreasing directions, and manually operable means for controlling the said valve means without regard to the action of said device to obtain a reverse drive shift or to obtain a different forward drive gearshift from that effected in a forward drive action by the speed controlled action of said valve means.

68. In a vehicle driving mechanism, a gearshift, a fluid pressure operated means for actuating the gearshift, a valve mechanism governing the fluid pressure operation of the gearshift actuating means for effecting reverse drive and variable speed forward drive shift actions, speed controlled means governing said valve mechanism for effecting normal forward drive gearshift actions at different vehicle speeds, and manually operable means for varying the fluid pressure control action of the valve means and the control action of the speed controlled means on said valve means to obtain a reverse drive shift and to obtain forward drive shift changes unobtainable by the action of the speed controlled means alone.

69. In a vehicle driving mechanism, a power operated gearshift, a speed controlled means for governing the power operation of the gearshift to effect normal forward drive gearshift actions at different vehicle speeds, and means for controlling the operation of the gearshift independently of the speed controlled means for operating the gearshift in a forward drive action thereof to effect a shift to a gear ratio varying from that determinable at the time by the speed controlled means.

70. In a vehicle driving mechanism, a power operated gearshift, a speed controlled means for governing the power operation of the gearshift to effect normal forward drive gearshift actions at different vehicle speeds, and manually operable control means for controlling the operation of the gearshift power means independently of the speed controlled means for operating the gearshift in a forward driving action thereof to effect a shift to a gear ratio varying from that determinable at the time by the speed controlled means.

71. A fluid pressure operated gear shifter comprising valve means for selectively controlling the operation of the gear shifter for a reverse drive action and for variable speed forward drive actions, speed controlled means for governing the valve means for selective forward drive gear shifts, and manually controlled means for governing the valve means for effecting a reverse drive gearshift or a selective forward drive gearshift independent of the action of the speed controlled means.

72. In a vehicle driving mechanism, a power operated stepped ratio transmission having several ratios, fluid pressure operated gear shifting means operating thereon, means controlled by vehicle speed for controlling power operation of the shifting means, means for limiting the controlled means to a predetermined speed position upon vehicle acceleration, and means for releasing the limiting means to permit movement of the controlled means to another speed position.

73. In a vehicle driving mechanism, a stepped ratio transmission having several ratios, fluid pressure operated shifting means operating thereon, control means therefor, said control means including a selector, means for moving the selector in a predetermined manner as the vehicle is accelerated, means for limiting the selector to an intermediate position, and means operated by the gear shift for rendering the limiting means ineffective.

74. In a vehicle driving mechanism, a stepped ratio transmission having several ratios, fluid pressure operated shifting means operating thereon, control means therefor, said control means including a fluid pressure controlling selector, means for moving the selector in a predetermined manner as the vehicle is accelerated to shift the transmission to successive ratios in a predetermined order, means for limiting the selector to an intermediate position, and means operated by the gearshift for rendering the limiting means ineffective.

75. In a vehicle driving mechanism, a stepped ratio transmission having several ratios, fluid pressure operated shifting means operating thereon, control means therefor, said control means including vehicle speed controlled selector means for controlling the fluid pressure operation of the shifting means and the shift effected by the control means, means for varying the shift control effected by the selector means, and gearshift controlled means for controlling the selector means in a certain position thereof.

76. In a vehicle driving mechanism, a gearshift, fluid pressure power means for operating the same, a vehicle movement controlled valve means for governing the fluid pressure operation of the power means for operating the gearshift to effect normal forward drive gearshift actions at different vehicle speeds, and means for manually controlling said valve means and the fluid pressure operation of the gearshift power means for operating the gearshift to effect a forward drive shift to a gear ratio varying from that determinable at the time by the valve means under action of the vehicle movement controlled means.

77. Shifting mechanism for an automobile transmission mechanism having shiftable speed changing elements, comprising actuating mechanism differently operative upon said elements to effect different speed changes, speed responsive means for automatically controlling said actuating mechanism, and control means manually operable independent of the speed responsive means and without interrupting the motion thereof for manual selection of speed changing operations of said actuating mechanism.

78. Shifting mechanism for an automobile transmission mechanism having shiftable speed changing elements, comprising actuating mechanism operative upon said elements to effect different speed changes, speed responsive means for controlling the operation of said actuating mechanism automatically according to speed, control means manually operable independently of said speed responsive means and without interrupting the motion thereof for manual selection of speed changing operations of said actuating mechanism, and means for visually indicating the setting of the shifting mechanism for different speed changes.

79. Shifting mechanism for an automobile transmission mechanism having shiftable speed changing elements, comprising actuating mechanism differently operative upon said elements to effect different speed changes, speed responsive means for automatically controlling said actuating mechanism, means for restoring said elements to neutral positions, and control means manually operable independently of said speed responsive means and without interrupting the motion thereof for manual selection of speed changing operations of the actuating mechanism and the restoring of said elements to neutral position.

80. Shifting mechanism for an automobile transmission mechanism having shiftable speed changing elements, comprising actuating mechanism differently operative upon said elements to effect different speed changes, a system of control devices cooperating in control actions on said mechanism to effect different shift changes, a speed responsive device operative on at least one of said control devices for controlling said system to effect automatic speed changes, and means manually operable independent of the speed responsive device for controlling said system of control devices to effect manual selection of speed changing operations of said actuating mechanism.

81. Shifting mechanism for an automobile transmission mechanism having shiftable speed changing elements, comprising power operated actuating mechanism operative upon said elements to effect different accelerating or decelerating speed changes, a set of control devices governing the operation of said actuating mechanism, a speed responsive device for automatically controlling the power operation of said actuating mechanism for effecting such changes according to speed, control means manually operable independently of said speed responsive device and while the latter is in motion for controlling said control devices to effect manual selection of speed changing operations of said actuating mechanism, and means for visually indicating the setting of the shifting mechanism for different speed changes.

82. Shifting mechanism for an automobile transmission mechanism having shiftable speed changing elements, comprising actuating mechanism differently operative upon said elements to effect different speed changes, a set of control devices governing the operation of said actuating mechanism, a speed controlled device for automatically influencing said actuating mechanism for effecting speed changes, and control means manually operable independently of said speed controlled device and during the action of said speed controlled device for arbitrarily controlling said actuating mechanism for effecting manual selection of speed changing operations of the actuating mechanism.

83. Shifting mechanism for an automobile transmission gearing having shiftable speed changing elements, comprising actuating mechanism including a set of power control elements differently operative for power control of said speed changing elements to effect different speed changes in accelerating and decelerating directions, a speed responsive device for automatically controlling the power control actions and influence of said power control elements upon said actuating mechanism for effecting speed changes in both directions, and control means manually operable independent of the speed responsive device for arbitrarily controlling the power control actions and influence of said set of power control elements upon said actuating mechanism for effecting a speed change in at least one of said directions.

84. Shifting mechanism for an automobile transmission gearing having shiftable gear changing elements, comprising actuating mechanism including a set of power control elements differently operative for power control of said gear changing elements to effect different speed changes in speed accelerating and decelerating directions, a speed responsive device for automatically controlling the power control actions of said power control elements for effecting speed changes in both directions, means for restoring said gear changing elements to neutral positions, and control means manually operable independently of said speed responsive device for arbitrarily controlling the power control actions of said set of power control elements upon said actuating mechanism for effecting a speed change in at least one of said directions and restoring said elements to neutral position in effecting speed changes.

85. Shifting mechanism for an automobile transmission gearing having gear changing elements comprising actuating mechanism differently operative upon said elements to effect different gear changes, a set of control devices for differently controlling the operation of said actuating mechanism to effect the gear changes, a speed responsive device for automatically controlling the action of said set of control devices on said actuating mechanism for gear changes according to vehicle speed, and manually operable means operable independently of the speed responsive device for controlling the action of said set of control devices on the actuating means for effecting gear changes.

86. Shifting mechanism for an automobile transmission gearing shifting for different gear changing actions comprising a gearshift mechanism, pneumatic power means for operating the same, a set of valves governing said power means for selectively effecting the gear changing actions, a speed controlled device controlling the action of said set of valves on the power means for effecting gear changing actions, and manually operable means operable independently of the speed controlled device for controlling the action of said set of valves on the power means for effecting gear changing actions.

87. Shifting mechanism for an automobile transmission gearing comprising gear changing elements, power means for shifting said elements to effect gear changes, a set of power control elements differently operative for power control of said power means and the shifting of said elements to effect different gear changes, a device driven by a moving part of the vehicle for governing said set of power control elements to effect gear changes responsive to vehicle speeds, and means manually operable independently of said device for governing said set of power control elements to effect gear changes by manual selection through the same set of power control elements while said speed responsive device is in motion and without interrupting the motion thereof.

88. In a power system having speed changing means, a driven member, a power operated gear shifting mechanism, a set of power control elements differently governing the power operation of the gear shifting mechanism to effect different gear changes, said power control elements being operable by and through control actions of the driven member to effect selective gear changes responsive to different speeds of said driven member, and manually operable means adapted to be operated independently of the driven member and without interrupting its motion for modifying a selective control action effected by said set of power control elements under the control action of said driven member and effecting a selective gear change different from that effected by a selective action of the driven member.

89. A power system including a prime mover, a driven member, a gear shifting mechanism for connecting said prime mover to said driven member, means including a device responsive to the speed of said driven member for automatically changing the gear ratio of said gear shifting mechanism, manually operable means for effecting a gear ratio change of said gear shifting mechanism while the speed responsive device is in motion, and means for opposing a resistance to speed accelerating motion of said speed responsive means under the action of said driven member.

90. A power system including a prime mover, a driven member, a gear shifting mechanism for connecting said prime mover to said driven member, means including a device responsive to the speed of said driven member for changing the gear ratio of said gear shifting mechanism, manually operable means for changing the gear ratio of said gear shifting mechanism while the speed responsive device is in motion, and spring means for opposing an elastic resistance to speed accelerating motion of said speed responsive device under action of said driven member.

ANTHONY C. VELO.